Patented Apr. 22, 1952

2,593,528

UNITED STATES PATENT OFFICE 2,593,528

MUCILAGINOUS MATERIALS FROM FLAXSEED

Don S. Bolley and Ralph H. McCormack, Brooklyn, N. Y., assignors to National Lead Company, New York, N. Y., a corporation of New Jersey No Drawing. Application October 23, 1947, Serial No. 781,774

2 Claims. (Cl. 260—209)

This invention relates to the production of mucilaginous products from flaxseed, and more particularly to the production of substantially protein free and fibre free mucilaginous products from de-oiled linseed meal.

It has long been recognized that flaxseed contains mucilage, and the prior art has shown that thick mucilaginous suspensions can be obtained from whole flaxseed. Such a procedure is satisfactory where there is no objections to the presence of other flaxseed constituents in the resulting suspension, or in cases in which it is immaterial whether or not other flaxseed values, such as linseed oil or protein products, are recovered. It is obvious that such a mucilaginous suspension is impure.

It has also been appreciated that soluble flaxseed mucilage can be prepared from de-oiled flaxseed meal by treatment with water or a dilute alkali to disperse the soluble and dispersible constituents, removing the non-dispersed fibrous impurities, precipitating the protein from the resulting dispersion by acidulation to the iso-electric point of protein (pH 4 to pH 6) and subsequently recovering mucilage from the solution by adding a large volume of alcohol. The alcohol addition results in precipitation of the mucilage; however, it is necessary to have an alcohol concentration of at least 50% before this can be accomplished. The mucilage precipitate may then be filtered off and dried. The economic aspects of this procedure, however, are not favorable, since a large quantity of alcohol is required to produce a relatively small amount of mucilage.

It is, therefore, the object of this invention to provide a method for the recovery of mucilage products from flaxseed by a simpler and more economical method than heretofore. It is a further object of this invention to provide a method for the recovery of substantially protein free and fibre free mucilage from de-oiled flaxseed meal. Another object of this invention is to provide a method for producing water soluble mucilage products from flaxseed. These and other objects of this invention will become apparent from the following description thereof.

This invention in its broadest aspects contemplates a treatment of flaxseed in which the oil content thereof is first extracted by means of a suitable solvent. The linseed oil may be recovered from the oil bearing solvent by known processes. The solid residue, or flaxseed meal, which remains after solvent extraction, is then processed to obtain a concentrate containing a comparatively high content of mucilaginous material.

Such treatment may preferably comprise first separating the meal by screening or air separation into two portions, one a kernel portion rich in protein, and the other a hull portion rich in mucilage. By such separation, a kernel portion is produced which is suitable for further processing to recover protein products therefrom, for example by the process described and claimed in our co-pending application No. 759,003, filed July 3, 1947, now abandoned.

The separation is preferably carried out employing an air separator and when suitable operating steps and conditions are employed, it has been found that a hull concentrate containing less than 15% protein may be readily obtained. In the case where less efficient separation is obtained, as by screening, for instance, the hull portion should be further processed to obtain a concentrate containing less than 15% protein. This concentration may be, for example, obtained by further screening the hull portion, retaining the oversize from a screen of about 35 to about 48 mesh. Other methods of concentration may be employed, as for instance, air separation or grinding or combinations of these, providing the protein content of the concentrate is reduced to within the desired range. The concentrate is then treated with slightly acidified water, i. e. of pH from about 4 to about 6 to solubilize or disperse the mucilaginous constituents. Solid fibrous residue is separated from the liquid portion by centrifuging. The liquid may then be concentrated, advantageously under reduced pressure, and spray dried to produce a dry, substantially protein and fibre free water soluble mucilage suitable for use in medicinal preparations, water paints, manufacture of soluble fibres and other applications where its gel forming properties are important.

Alternatively, this invention contemplates a modification of the above general process wherein the hull portion as above described is treated to produce a concentrate containing less than about 7% protein. Under these conditions, it has been found that plain water, that is of normal or neutral pH, may be employed in the extraction step. The soluble mucilage produced by drying the liquid resulting from said extraction will be found of purity comparable to that obtained by the general process first described.

The step of solvent extraction and de-oiling the flaxseed, as noted in the general outline above, may be advantageously conducted by first flaking or crushing the seed to provide better penetration of the solvent. The crushed seed may then be treated with any suitable solvent, such as hexane, in a closed container for a length of time sufficient to dissolve the oil. This may be 60 minutes more or less depending on conditions. After extraction, the solvent and dissolved oil are separated from the residue or linseed meal, for instance, by means of a filter or centrifuge.

The linseed meal, or residue, is freed of solvent and then separated into a kernel portion, rich in protein, and a hull portion, rich in mucilage.

Separation of the residue into kernel and hull portions is accomplished by suitable apparatus which effects a separation based on particle size or shape or specific gravity or combinations of these characteristics. This may be accomplished by screening or air separation or a combination of both. It is preferred to make this separation by means of an air separator which is so operated as to produce a kernel concentrate containing more than 40% and preferably about 50% protein.

An air separator which may be of the revolving vane, or whizzer type will be found to give efficient separation. Thus a whizzer type separator having a blade diameter of 7⅛ inches revolved at 3,600 R. P. M. in a 10 inch chamber with a feed rate of 20-25 lbs. per hour and recirculating the hull portion gave a separation as shown in Table I below.

*Table I*

Original de-oiled meal, 34.5% protein.
After air separation:
    Kernel portion 53%, containing 31.6% protein.
    Hull portion 47%, containing 10.6% protein.

A sample of de-oiled meal was screened to effect the separation into hull and kernel portion. A 65 mesh screen was employed and Table II below shows typical results obtained using this method of separation.

*Table II*

Original de-oiled meal, 38.0% protein.
After screening (65 mesh screen):
    Kernel portion (−65 mesh screen) 42.9%, containing 55.3% protein.
    Hull portion (+65 mesh screen) 57.1%, containing 51.6% protein.

When the method of this invention is employed, the protein may be readily and economically recovered from the kernel fraction without forming thickened, viscous and hard to separate slurries such as would be obtained in the presence of an appreciably larger amount of the hull constituents.

In the case of the air separated hull portion as described above (Table I) no further concentration is necessary and it may be used directly in the acidulated water extraction step. In the case of the screened hull portion (Table II) additional treatment, for instance, screening over a 35 to 48 mesh screen is necessary to obtain a product containing less than 15% protein suitable for extraction.

Further concentration of the mucilage-containing hull portion or the concentrate obtained above may readily be accomplished by grinding the material in an impact type of grinding mill, preferably of the type known as a screen mill. Such a mill is equipped with hammers rotating at high speed and a screen through which the ground material is discharged. Screens of about ⅛ inch to 3/32 inch mesh diameter or the equivalent may be used in such a mill. After grinding, air separation is employed to obtain a hull concentrate containing less than 7% protein.

Extraction of the mucilage from the hull concentrate is accomplished as hereinbefore described by treatment with acidified water, or, in the case where the protein content of the hull concentrate is less than about 7%, if desired, with normal or neutral water that is of pH approximately 7. If advantageous, the acidified water extraction may be applied to hull concentrates of the purer grade to produce a purer product, and the higher protein content concentrate may be extracted with non-acidified water if a relatively poorer grade of mucilage is acceptable. Acidified water as herein used is intended to be acidified to approximately the iso-electric point of protein solutions or dispersions. This will normally range from pH 4 to about pH 6. Non-acidified water will be of pH of 7 more or less within limits normally encountered in commercial supply.

Extraction treatment comprises intimate contact of the extraction liquid with the hull concentrate. This may be accomplished by agitating a mixture of the liquid and concentrate in a suitable vessel until substantially all the mucilage products have been solubilized or dispersed. Elevated temperatures of for instance from about 60°-80° C. are helpful. The proportions of concentrate and liquid may be of the order of 1 part of concentrate to from 20 to 50 parts of liquid. It is preferred to conduct the extraction by countercurrent treatment in a series of stages according to known principles thereby to obtain a more concentrated liquid product and more efficient removal of mucilaginous material from the solid concentrate.

After extraction, the fibrous residue is separated from the extraction liquid by centrifuging and the separated liquid is concentrated and spray dried to yield the dry soluble mucilage product.

It has been found that the acidified water extraction procedure forming a part of the unique process of this invention is effective in producing fibre free and substantially protein free products when the hull constituents are concentrated to an extent where by analysis the protein content is found to be less than about 15%. When the hull constituents are concentrated to an extent that the protein content is less than about 7%, either the acidified water or the plain water extraction procedure may be used, the acidified water treatment producing a slightly purer product. However, the product from plain water treatment is economically produced and of satisfactory purity. As a matter of general processing economy, it is preferred to concentrate to slightly below 15% protein and then extract with acidified water as illustrated in Example I.

The use of the protein content as a determining characteristic in concentration of the hull portion is indirect but convenient. Analysis for actual content of mucilaginous constituents is complex and laborious while the determination of nitrogen, for instance, by the well-known Kjeldahl method is simple and rapid. The calculation of protein content from the determined nitrogen is well known.

The following examples will serve to further illustrate the novel process of this invention.

EXAMPLE I 8.62 pounds of flaxseed were prepared for extraction by passing through crushing rolls. The flaked seed was then treated with 4.5 parts of solvent (hexane) for each part of seed in a closed extractor at room temperature. The solvent was added in three portions each of which was in contact with the seed for a period of 20 minutes. The extracted meal and oil bearing solvent were separated by means of a filter in the bottom of the extractor, and yielded 5.17 pounds of de-oiled meal. The linseed oil was separated from the oil-solvent mixture by distillation of the solvent which was thus recovered for re-use.

Analysis of the de-oiled meal at this stage showed a protein content of 34.5%. Air separation was then employed to separate the meal into a kernel portion, rich in protein, and a hull portion. The air separator was of the centrifugal fan type and was adjusted and operated to give a fine fraction, the kernel portion and a coarser fraction, the hull portion. Anaylsis of the hull portion at this stage showed a protein content as follows: Hull portion, 16.1% protein.

The hull portion was then screened on a 35 mesh screen, the undersize discarded, and the plus 35 mesh material forming a hull concentrate amounting to 21% by weight of the meal taken as follows: Hull concentrate, 11.0% protein.

The hull concentrate was then mixed with water in proportion of 1 part of concentrate to 30 lbs. water. The pH was then adjusted to pH about 4.5 with acid and the temperature of the mixture was elevated to 60°–80° C. The mass was agitated and maintained at this temperature for about 1 hour. The extraction liquid was then separated from the fibrous undissolved residue by centrifuging and the liquid centrifugate was then adjusted to pH 7 with alkali, concentrated under reduced pressure, and spray dried. The dried product was substantially protein and fibre free mucilage. Tested for gel forming efficiency, the product formed an acceptable gel when used in amount of 4.4% in aqueous solution.

EXAMPLE II

The hull concentrate as obtained above in Example I was further concentrated by grinding in a high speed hammer mill equipped with a 1/16″ screen followed by air separation. The resulting concentrate, amounting to 15.4% of the de-oiled meal taken was found to have a protein content as follows: Hull concentrate, 6.45% protein.

This concentrate was then extracted with water in a countercurrent extraction system using a solids to liquid ratio of 1 to 30. The extraction was carried out in 3 stages, each stage consisted of agitation of the liquid-concentrate mixtures at a temperature of 60°–80° C. for about 1 hour followed by centrifugal separation of the liquid and solid portions. The final liquid portion containing the soluble mucilage was concentrated under reduced pressure and spray dried. The product was substantially protein and fibre free mucilage. Tested for gel forming efficiency, the product formed an acceptable gel when used in amount of 2.6% in aqueous solution.

The process of this invention is advantageous in that valuable mucilage products are produced and also the linseed oil and proteinaceous portions of the flaxseed may be recovered. The mucilage products are water soluble, fibre free and substantially protein free and useful in the arts due to their gel forming properties. It has been found that the mucilage products of this invention will form satisfactory gels when used in amounts of generally less than 5% in aqueous solution.

While this invention has been described and illustrated by the examples shown, it is not intended to be strictly limited thereto and other modifications and variations may be employed as limited by the following claims.

We claim:

1. A process for producing a gel suitable for use in medicinal preparations, water paints, manufacture of soluble fibers, and the like which comprises treating substantially oil-free flaxseed meal by means of air separation to yield a kernel portion containing more than 40% protein and a hull portion containing less than 20% protein, screening the hull portion on a 35 to 48 mesh screen, the material remaining on the screen constituting a mucilage concentrate containing less than 15% protein, treating said mucilage concentrate with acidulated water of from about pH 4 to about pH 6 under substantially atmospheric pressure to form a solution containing the mucilaginous constituents thereof, separating this solution from the insoluble residue, neutralizing the solution, drying the neutralized solution thereby to recover a substantially protein-free mucilage therefrom and dissolving said mucilage in water in amount to form an aqueous gel containing less than 5% of said mucilage.

2. A process for producing a gel suitable for use in medicinal preparations, water paints, manufacture for soluble fibers, and the like which comprises treating substantially oil-free flaxseed meal by means of air separation to yield a kernel portion containing more than 40% protein and a hull portion containing less than 20% protein, screening the hull portion on a 35 to 48 mesh screen, the screen retaining a mucilage concentrate containing less than 15% protein, grinding said mucilage concentrate by the impact method, air separating the ground material to yield a second mucilage concentrate containing less than 7% protein, extracting said second mucilage concentrate with water under substantially atmospheric pressure at a temperature of 60° to 80° C. in a plurality of stages of a countercurrent extraction system, the liquid-concentrate mixtures being agitated in each stage of said system, centrifugally separating the resulting solution containing the mucilaginous constituents from the solid residue, concentrating said solution under reduced pressure, spray-drying the resulting concentrated mucilage, and dissolving said dried mucilage in water in amount to form an aqueous gel, containing less than 5% mucilage.

DON S. BOLLEY.
RALPH H. McCORMACK.

REFERENCES CITED

The following references are of record in the file of this patent:

FOREIGN PATENTS

| Number | Country | Date |
|---|---|---|
| 207,116 | Great Britain | Nov. 22, 1923 |

OTHER REFERENCES

Ind. Eng. Chem. v. 38 (1946): Painter et al., pages 95–98, 4 pages; Smith et al., pages 353–356, 4 pages.